United States Patent
Zaccanti (10) Patent No.: US 9,994,389 B2
(45) Date of Patent: Jun. 12, 2018

(54) FILTER FOR CAPSULES FOR MAKING ESPRESSO COFFEE AND CAPSULE FOR MAKING ESPRESSO COFFEE

(71) Applicant: CAFFITALY SYSTEM S.P.A., Gaggio Montano (Bologna) (IT)

(72) Inventor: Giovanni Zaccanti, Gaggio Montano (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 0 days. days.

(21) Appl. No.: 15/327,411

(22) PCT Filed: Jul. 29, 2015

(86) PCT No.: PCT/IB2015/055726
§ 371 (c)(1),
(2) Date: Jan. 19, 2017

(87) PCT Pub. No.: WO2016/016819
PCT Pub. Date: Feb. 4, 2016

(65) Prior Publication Data
US 2017/0313496 A1    Nov. 2, 2017

(30) Foreign Application Priority Data

Jul. 31, 2014 (IT) .............................. VR2014A0196

(51) Int. Cl.
*B65D 85/804* (2006.01)
*A47J 31/06* (2006.01)
(Continued)

(52) U.S. Cl.
CPC ...... *B65D 85/8043* (2013.01); *A47J 31/0668* (2013.01); *B65D 77/20* (2013.01); *B65D 77/24* (2013.01)

(58) Field of Classification Search
CPC .................................................. B65D 85/8043
See application file for complete search history.

(56) References Cited

U.S. PATENT DOCUMENTS

| 7,543,527 B2 | 6/2009 | Schmed |
| 7,552,672 B2 | 6/2009 | Schmed |

(Continued)

FOREIGN PATENT DOCUMENTS

| EP | 1344722 A1 | 9/2003 |
| EP | 1555219 A1 | 7/2005 |

(Continued)

*Primary Examiner* — Erik Kashnikow
*Assistant Examiner* — Chaim A Smith
(74) *Attorney, Agent, or Firm* — Pearne & Gordon LLP (57) ABSTRACT

A filter for capsules for making espresso coffee by passing pressurised hot water through ground coffee powder, the filter (2) being rigid or semi-rigid, bowl-shaped and comprising a first base wall (3), a first lateral wall (4), a first upper edge (5) and a plurality of passages passing through it and which comprise an inlet section (10) facing towards an inner part (6) of the bowl and an outlet section (11) facing towards an outer part (7) of the bowl, at least the inlet sections (10) of the passages being made in parts of the filter (2) which are radially separated from the central axis by a distance equal to at least two thirds of the minimum radial distance of the first lateral wall (4) from the central axis; and a capsule comprising said filter (2) near to a second base wall (16) of it.

37 Claims, 6 Drawing Sheets

(51) Int. Cl.
*B65D 77/20* (2006.01)
*B65D 77/24* (2006.01)

(56) References Cited

U.S. PATENT DOCUMENTS

| | | |
|---|---|---|
| 7,836,819 B2 | 11/2010 | Suggi Liverani et al. |
| 8,443,717 B2 | 5/2013 | Venturi et al. |
| 8,464,630 B2 | 6/2013 | Suggi Liverani et al. |
| 8,464,631 B2 | 6/2013 | Suggi Liverani et al. |
| 8,464,632 B2 | 6/2013 | Suggi Liverani et al. |
| 2003/0172813 A1 | 9/2003 | Schifferle |
| 2005/0150390 A1 | 7/2005 | Schifferle |
| 2007/0148290 A1 | 6/2007 | Ternite et al. |
| 2007/0186784 A1 | 8/2007 | Liverani et al. |
| 2009/0047389 A1 | 2/2009 | Jarisch et al. |
| 2010/0043644 A1 | 2/2010 | Suggi Liverani et al. |
| 2010/0043645 A1 | 2/2010 | Suggi Liverani et al. |
| 2010/0043646 A1 | 2/2010 | Suggi Liverani et al. |
| 2010/0077928 A1 | 4/2010 | Schifferle |
| 2010/0108541 A1 | 5/2010 | Roberto |

FOREIGN PATENT DOCUMENTS

| | | |
|---|---|---|
| EP | 1792850 A1 | 6/2007 |
| EP | 1980501 A1 | 10/2008 |
| WO | 2005092160 A1 | 10/2005 |
| WO | 2007096196 A2 | 8/2007 |
| WO | 2008126045 A1 | 10/2008 |
| WO | 2009006374 A2 | 1/2009 |

FILTER FOR CAPSULES FOR MAKING ESPRESSO COFFEE AND CAPSULE FOR MAKING ESPRESSO COFFEE

This invention relates to a capsule for making espresso coffee of the type containing powdered coffee which, when pressurised hot water is passed through it, produces espresso coffee. In particular, the innovative part of this invention relates to the filter used in the capsule for filtering the espresso coffee coming out of the capsule and retaining the coffee powder inside the capsule.

At present there are many prior art types of capsules for making espresso coffee.

However, this invention is preferably intended for those capsules comprising a cup-shaped main containment body, closed at the top by a lid, in which the coffee powder is contained. Between the coffee powder and the capsule espresso coffee outlet (an outlet constituted of one or more holes made in the capsule either during production or during use) a filter equipped with through passages/holes is interposed. For example, capsules of this type are described in patents EP 1 344 722 and EP 1 980 501 by this same Applicant. In both cases the filter is bowl-shaped and comprises a base wall in which through holes are made. In the case of patent EP 1 344 722 the through holes have a circular cross-section, whilst in the case of EP 1 980 501 they are slot-shaped.

One of the essential features of a good espresso coffee is that it has, on the surface, a layer of foam which is known in the sector as "crema", emphasising how it should preferably be a thick, dense foam in which, if possible, the air bubbles contained are so small that they cannot be seen or are only just visible to the naked eye. To form the "crema" it is important that the capsule has a certain hydraulic resistance to the passage of the pressurised water and is able to cause a partial emulsion of the espresso coffee.

Both the embodiment in patent EP 1 344 722 and that in patent EP 1 980 501 (the two differ because of the shape of the through holes made through the filter), allow the formation of a suitably thick layer of foam.

Although capsules made according to the above-mentioned two patents both allow an excellent quality espresso coffee to be obtained in many cases, the Applicant's experience in the sector has highlighted how, in certain extraction conditions and for certain coffee powders and/or particle size measurements, although it has a suitable thickness, the layer of "crema" may not be as dense and compact as would be hoped. During supplying of the espresso coffee it is also possible that the outflow of espresso coffee visually appears discontinuous in terms of the flow rate, because of the presence of several air bubbles that are too large in it. When supplying is complete, that results in the presence, typically at the centre of the espresso coffee, of a build-up of clearly visible air bubbles, that is to say, a zone of the layer of foam that is not dense and thick enough.

In this context, the technical purpose which forms the basis of this invention is to provide a capsule for making espresso which overcomes the above-mentioned disadvantages.

In particular, the technical purpose of this invention is to provide a capsule for making espresso coffee which allows the obtainment in the espresso coffee of a surface layer of "crema" that is denser, thicker and more even than that which can be obtained with prior art capsules.

It is also the technical purpose of this invention to provide a capsule for making espresso coffee which allows a more even supplying flow of espresso coffee to be obtained.

The technical purpose specified and the aims indicated are substantially achieved by a capsule for making espresso coffee as described in the appended claims.

Further features and advantages of this invention are more apparent in the detailed description below, with reference to a preferred, non-limiting embodiment of a filter and a capsule for making espresso coffee, illustrated in the accompanying drawings, in which.

With reference to the accompanying drawings, the numeral 1 denotes in its entirety a capsule for making espresso coffee and the numeral 2 denotes the filter in accordance with this invention. In fact, as is described in more detail below, the innovative aspect of this invention is linked to the structure of the filter 2 which is therefore the subject matter of this invention even as such.

The filter 2 according to this invention is rigid or semi-rigid. That definition means that the filter 2 must be made in such a way that it has, at least in all of the conditions of use, an overall shape that is substantially stable with the exception of small deformations. In the embodiments illustrated, in particular, the filter 2 is advantageously entirely made of plastic material (preferably by moulding). In other embodiments it may even be made of two or more different materials: for example, it may comprise a body made of plastic material (acting as a rigid or semi-rigid skeleton) on which a flexible filtering material is applied.

The filter 2 is advantageously bowl-shaped and comprises a first base wall 3, a first lateral wall 4 and a first upper edge 5. The first base wall 3 has a main plane of extension and, in plan view, advantageously a circular or circular ring shape as in the embodiments illustrated in the accompanying drawings. The first lateral wall 4 extends transversally to the main plane of extension, starting from the outer edge of the first base wall 3 and from a side of the first base wall 3 intended in use to be facing towards the coffee powder. In the preferred embodiments, the first lateral wall 4 extends either on a cylindrical surface or on a conical surface diverging away from the first base wall 3. The first upper edge 5 delimits the first lateral wall 4 on the side opposite the first base wall 3 and in the preferred embodiment extends radially outwards (radially relative to a central axis of the filter 2—and of the capsule 1—substantially perpendicular to the first base wall 3). Considering the bowl shape of the filter 2, hereinafter the term "bowl" will be used to refer to said shape. Therefore, in the bowl an inner part 6 (which in use will face towards the coffee powder) and an outer part 7 (from which in use the espresso coffee comes out and moves away) will be defined.

Advantageously, the filter 2 also comprises a plurality of spacer elements 8, projecting relative to the first base wall 3 (they are preferably made in one piece with it), which are designed to in use keep the first base wall 3 at a distance from the part of the capsule 1 which it is facing.

Figure 12:
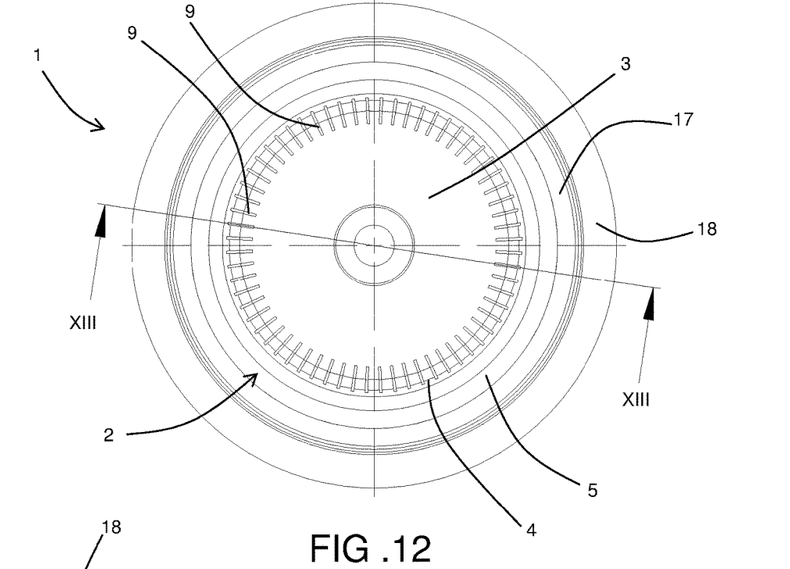
FIG. 12 is a top view of several parts of a capsule for making espresso coffee made in accordance with a second embodiment of this invention.
Figure 13:
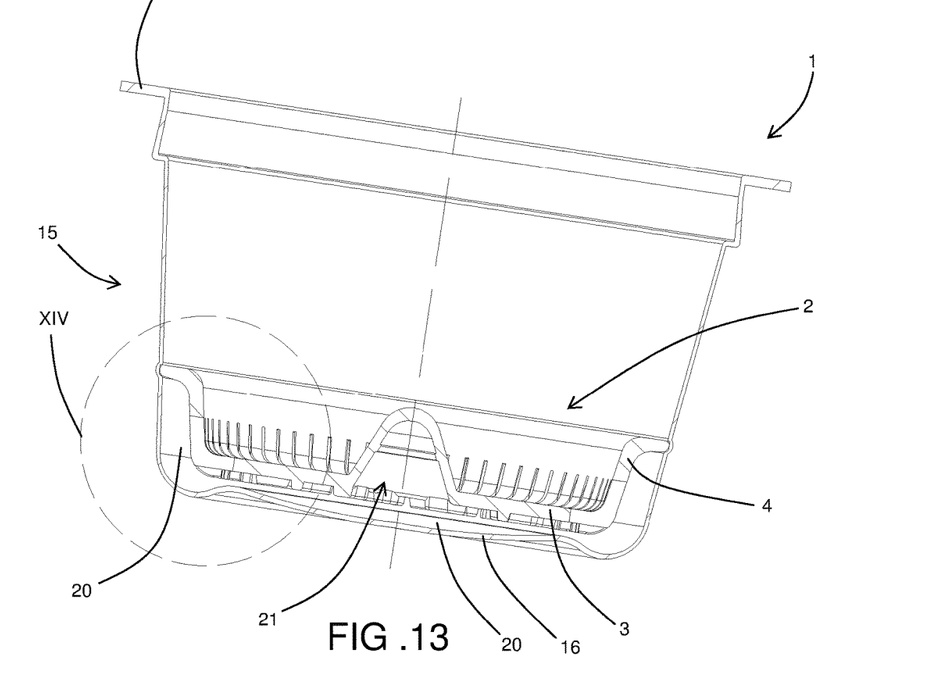
FIG. 13 is a cross-section of the parts of FIG. 12 according to the line XIII-XIII.
Figure 14:
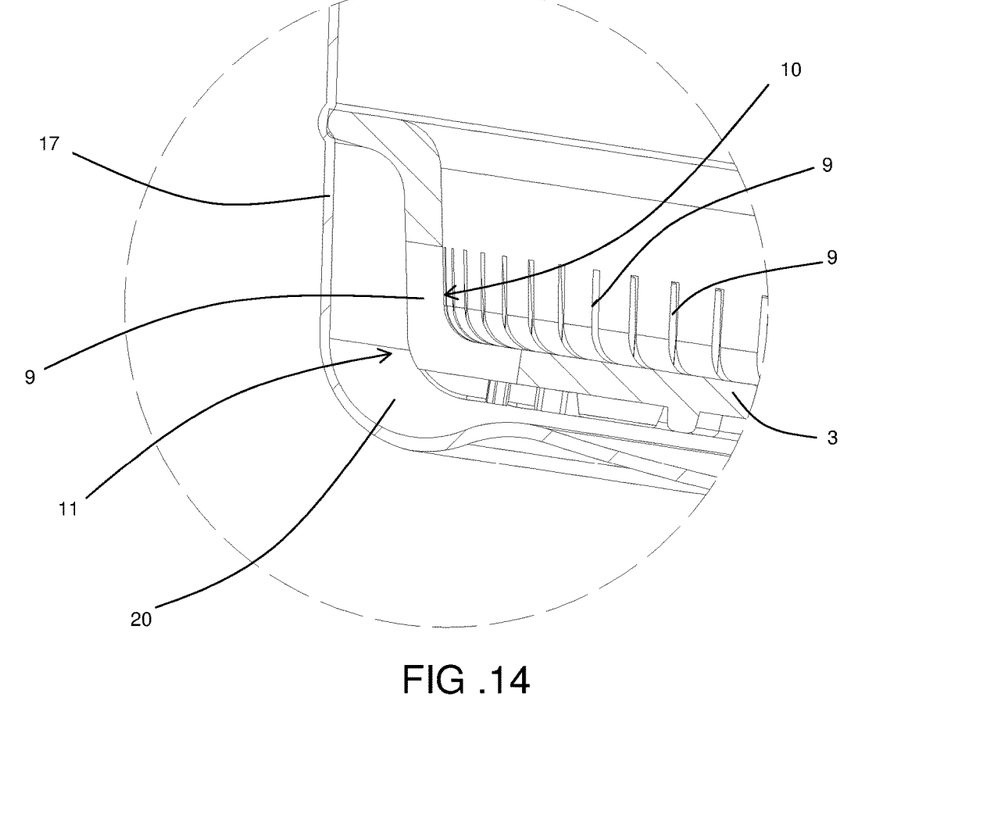
FIG. 14 is an enlarged view of the detail XIV of FIG. 13.
Figure 15:
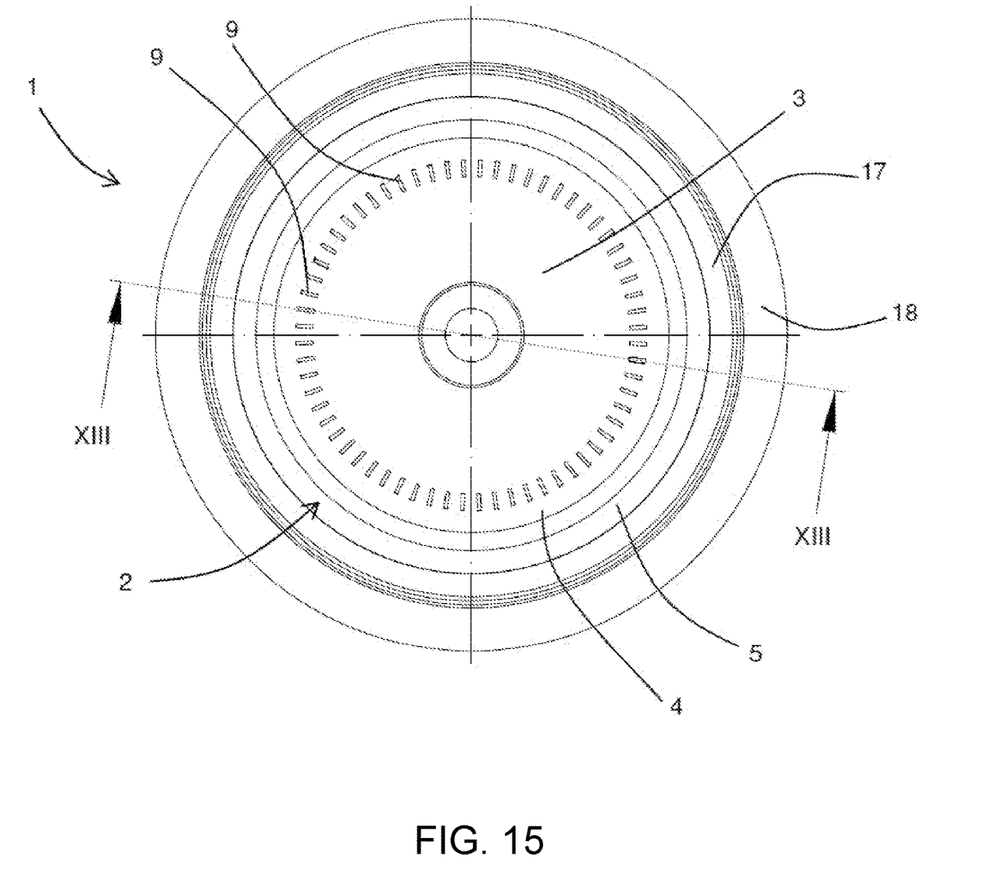
FIG. 15 is a top view of an embodiment of the invention similar to FIG. 12.

The filter 2 is equipped with a plurality of passages which pass through it and are designed to allow in use the transit of the espresso coffee and to retain the coffee powder. In the preferred embodiment in which the filter 2 is a single piece, the passages are constituted of suitably sized through holes 9. Such passages have an inlet section 10 facing towards the inner part 6 of the bowl and an outlet section 11 facing towards the outer part 7 of the bowl. According to the innovative aspect of this invention, moreover at least the inlet sections 10 of the passages are all made in parts of the filter 2 which are radially separated from the central axis, by a distance equal to at least two thirds of the minimum radial distance of the first lateral wall 4 from the central axis. That means that the inlet sections 10 are made either all exclusively in the first lateral wall 4 as in the embodiment of FIGS. 1 to 11, or partly in the first lateral wall 4 and partly in the first base wall 3 as in the embodiment of FIGS. 12 to 14, or exclusively in the first base wall 3 as in the embodiment of FIG. 15. As regards the embodiment in which the inlet sections 10 are made partly in the first lateral wall 4 and partly in the first base wall 3, it may be the case either that each passage extends both on the first lateral wall 4 and on the first base wall 3 (as in the case in FIGS. 12 to 14), or that there are passages made through only the first lateral wall 4 and passage made through only the first base wall 3 (solution not illustrated).

Therefore, according to this invention, at least the central part of the first base wall 3 is (at least substantially) free of passages through which the espresso coffee can flow and constitutes a screen which blocks the flow of the espresso coffee and redirects it radially outwards, towards the passages made in the peripheral zone of the filter 2. In the case of a circular filter (2), the zone (at least substantially) free of passages is also circular and has a radius equal to at least two thirds of the radius of the base wall 3. In particular, in the embodiment in FIGS. 12 to 14, the zone which is free of passages has a radius equal to approximately four fifths of the radius of the base wall 3, whilst in the embodiment in FIGS. 1 to 11, in which at least the inlet sections 10 of the passages are all made in the first lateral wall 4, the first base wall 3 is (at least substantially) free of passages through which the espresso coffee can flow.

Moreover, preferably, in the embodiment in which the inlet sections 10 of the passages are made only through the first lateral wall 4, they are positioned near to the first base wall 3, even if, advantageously, they are positioned at a slightly raised height, measured parallel to the central axis, relative to the surface 12 of the first base wall 3 positioned in the inner part 6 of the bowl (advantageously several tenths of a millimetre higher). In this way, the flow of espresso coffee that reaches the first base wall 3 and is directed radially outwards by it, must rise slightly up the first lateral wall 4 before being able to reach one of the passages through which it can flow out of the filter 2. In the preferred embodiment, at least the inlet sections 10 of the through holes 9 (but advantageously all of their cross-sections) are elongate according to a main trajectory of extension and each have a length, measured along the main trajectory of extension, which is greater than their width, measured transversally to the main trajectory of extension (in other words, they are slot shaped).

Preferably, the width of the inlet sections 10 is less than 0.4 mm and even more preferably it is less than 0.25 mm, whilst the length on each wall of the filter (2) (first base wall 3 and first lateral wall 4) is less than 5 mm and even more preferably less than 2 mm.

In the preferred embodiment each slot extends straight, lying in a plane passing through the central axis.

However, preferably, the sum of the areas of the inlet sections 10 of all of the through holes 9 is between 10 and 20 mm$^2$. Moreover, advantageously, the number of through holes 9 is between 40 and 70.

In the preferred embodiment, the through holes 9 have a transit cross-section which increases from the inlet section 10 to the outlet section 11.

Figure 1:
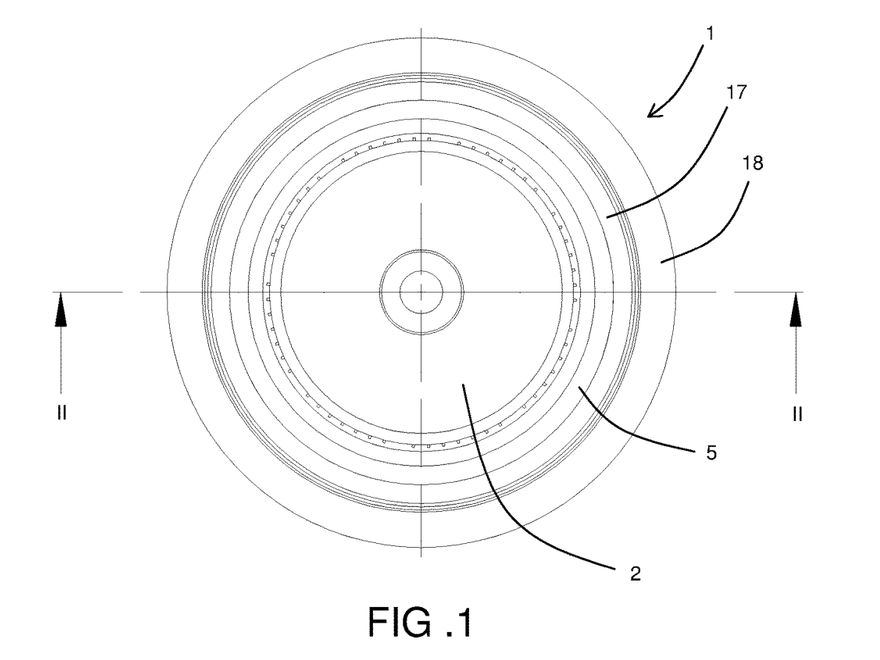
FIG. 1 is a top view of several parts of a capsule for making espresso coffee made in accordance with a first embodiment of this invention.
Figure 2:
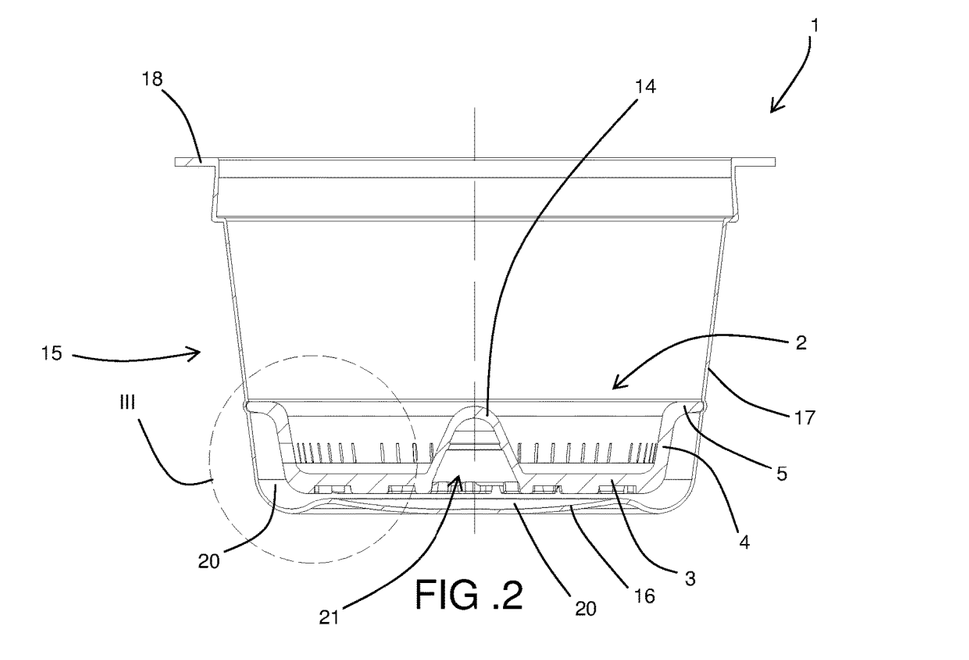
FIG. 2 shows the parts of FIG. 1 in cross-section according to the line II-II.
Figure 3:
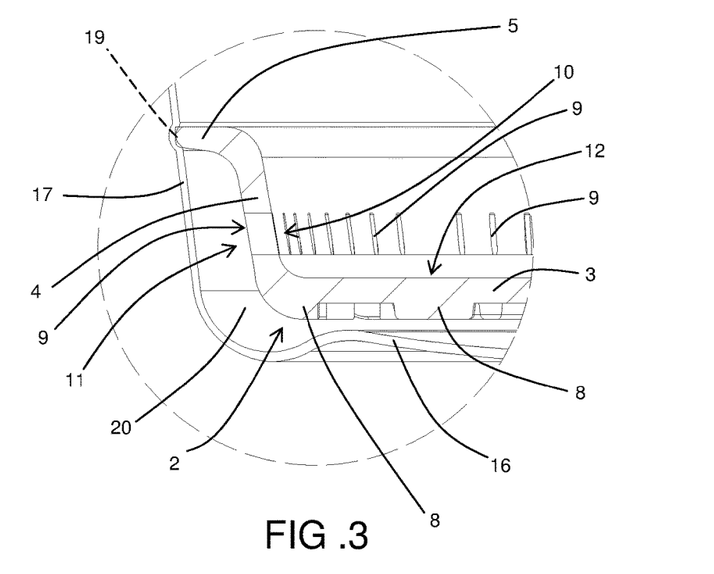
FIG. 3 is an enlarged view of the detail III of FIG. 2.
Figure 4:
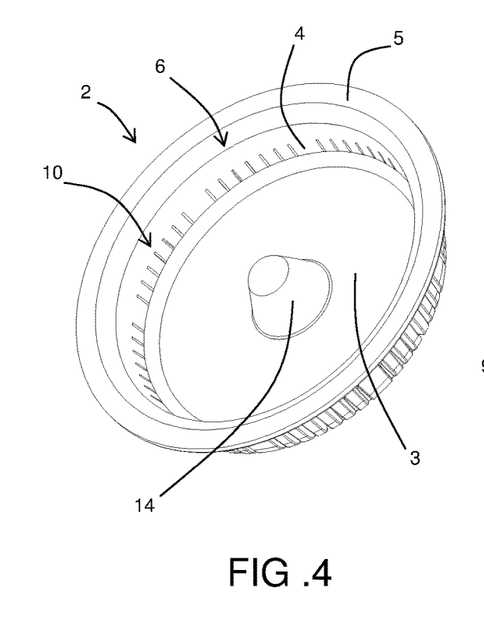
FIG. 4 is an axonometric top view of a filter of the capsule of FIG. 1 made in accordance with the first embodiment of this invention.
Figure 5:
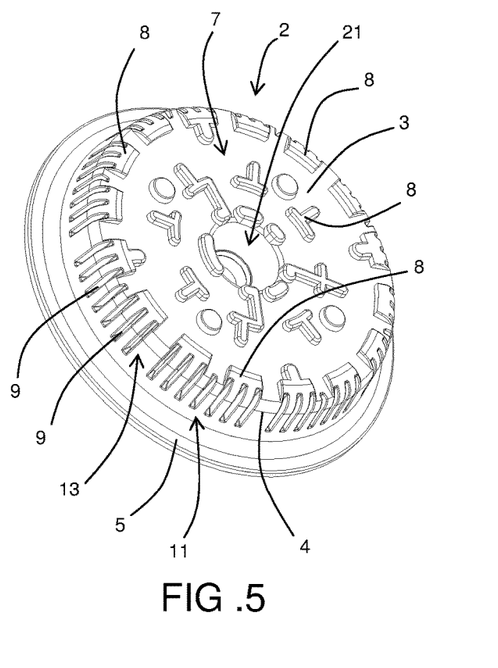
FIG. 5 is an axonometric bottom view of the filter of FIG. 4.
Figure 6:
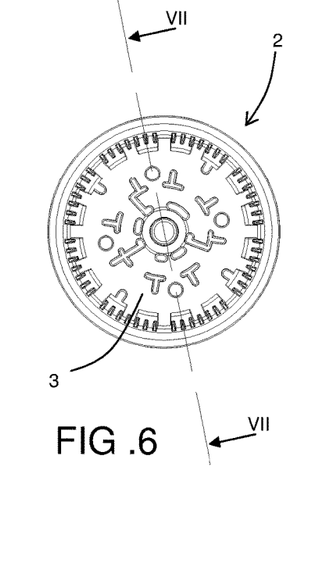
FIG. 6 is a bottom view of the filter of FIG. 4.
Figure 7:
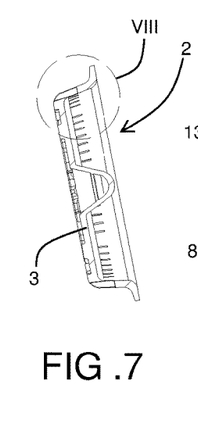
FIG. 7 is a cross-section of the filter of FIG. 6 according to the line VII-VII.
Figure 8:
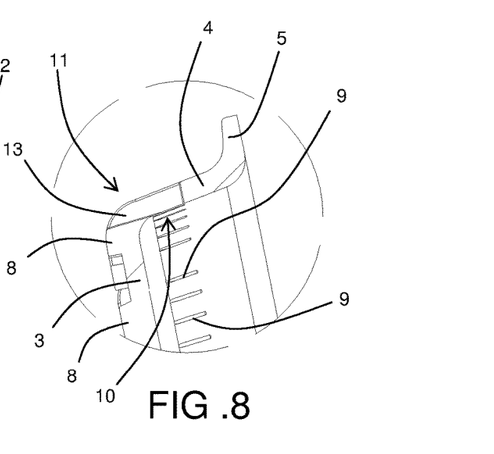
FIG. 8 is an enlarged view of the detail VIII of FIG. 7.
Figure 9:
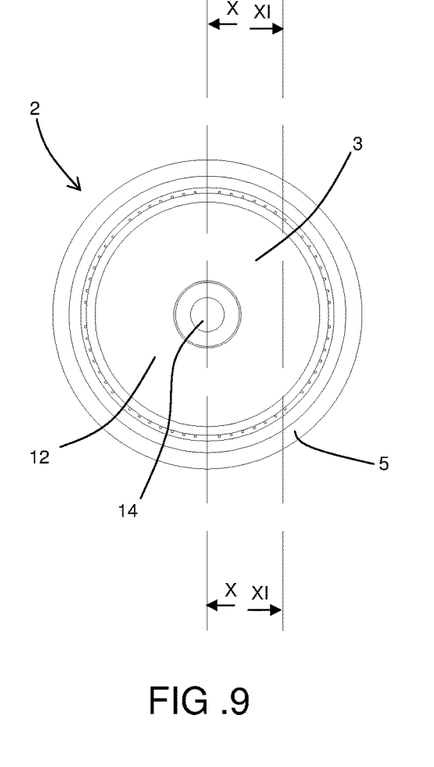
FIG. 9 is a top view of the filter of FIG. 4.
Figure 10:
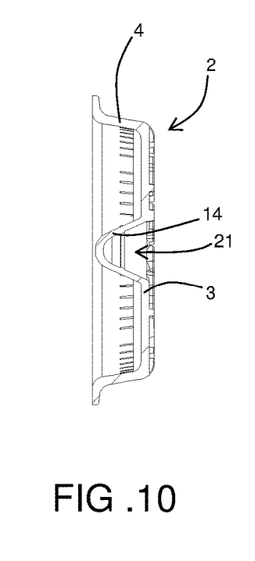
FIG. 10 is a cross-section of the filter of FIG. 9 according to the line X-X.
Figure 11:
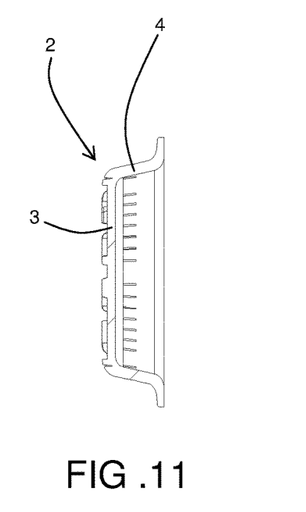
FIG. 11 is a cross-section of the filter of FIG. 9 according to the line XI-XI.

As is clearly shown in FIGS. 5 and 7, in the first embodiment illustrated, at the outer part 7 of the bowl, at least several through holes 9 each constitute an outflow channel 13 for the espresso coffee towards the first base wall 3. Each outflow channel 13 extends on the first lateral wall 4 and until it leads to the outer side of the first base wall 3. Consequently, the corresponding outlet sections 11 extend partly on the first lateral wall 4 and partly on the first base wall 3.

In the first embodiment illustrated in which the filter 2 comprises spacer elements 8, at least several of them are distributed along the periphery of the first base wall 3 and at least several of the outflow channels 13 also partly extend on said spacer elements 8 distributed along the periphery of the first base wall 3 (FIG. 5).

Furthermore, in the embodiments illustrated in which the filter 2 is intended to be used in a capsule 1 in which the outlet for the espresso coffee is made at the moment of use by a special piercing spike, there is also at least one shaped portion 14 present which extends from the first base wall 3, and at the centre of it, towards the inner part 6 of the bowl and which, at the outer part 7 of the bowl, forms a housing 21 for the piercing spike. In the preferred embodiments the shaped portion 14 is conical, frusto-conical, cylindrical or hemispheric.

Finally, in accordance with this invention, the filter 2 is sized in such a way that the first lateral wall 4 has a height, relative to the first base wall 3 (measured perpendicularly to the main plane of extension and up to the top of the first upper edge 5), which is less than one third of the maximum width of the first base wall 3 (diameter in the accompanying drawings) measured parallel to the main plane of extension. In turn, the shaped portion 14 has a height similar to that of the first lateral wall 4.

With reference to the capsule 1 which is the subject matter of this invention, equipped with the filter 2 described above, it comprises first a cup-shaped main body 15 comprising a second base wall 16, a second lateral wall 17 and a second upper edge 18 to which a lid is fixed (of the known type and not shown in the accompanying drawings) which closes the main body 15. Advantageously, the main body 15, the lid and the fixing of the lid to the main body 15 are all gas-tight.

Positioned inside the main body 15 there are at least one dose of coffee powder (also not illustrated in the accompanying drawings) and at least one filter 2 of the type described above. In particular, the filter 2 is positioned near to the second base wall 16, and is positioned between the coffee powder and the second base wall 16. In turn, the first upper edge 5 of the filter 2 is peripherally coupled to the second lateral wall 17. Advantageously, it is coupled to a groove 19 (as in the first embodiment illustrated) and/or to a rib (solution not illustrated) extending in an annular fashion about the central axis of the capsule 1 (which corresponds to the central axis of the filter 2).

Also defined inside the capsule 1 is an outflow chamber 20 for the espresso coffee, made between the first base wall 3 and the second base wall 16 and between the first lateral wall 4 and the second lateral wall 17, and which the outlet sections 11 of the passages face. Both the radial projection of the first upper edge 5, and the spacer elements 8 operate in conjunction with one another to guarantee that the outflow chamber 20 cannot collapse on itself in any conditions of use.

Finally, in terms of size, a plane passing through the first upper edge 5 of the filter 2 is separated from the first base wall 3 by less than one third of the distance between the first base wall 3 and the lid, just as the shaped portion 14 protrudes from the first base wall 3, perpendicularly to the main plane of extension, by a distance which is less than one third of the distance between the second base wall 16 and the lid.

Operation of the capsule 1 and of the filter 2 according to this invention is similar to the operation of those currently known, the only difference having already been highlighted relating to the passage of the espresso coffee through the filter 2 (coming out only in the peripheral zone and, advantageously, in a radial direction rather than the axial direction of the prior art).

This invention brings important advantages.

In fact, tests carried out by the Applicant showed that using the filters and capsules according to this invention it was possible to obtain in the espresso coffee a surface layer of foam that was denser and thicker than with prior art capsules, and which can therefore be truly defined a "crema". In particular, tests showed a considerable improvement in the quality of the "crema" with reference to the use, in the same capsule, of filters having the same number (56) of through holes with identical size (slots with inlet section 10 measuring 0.2×1.5 mm) that are positioned at the first lateral wall rather than at the entire first base wall.

Finally, it should be noticed that this invention is relatively easy to produce and that even the cost linked to implementing the invention is not very high. The invention described above may be modified and adapted in several ways without thereby departing from the scope of the inventive concept.

All details of the invention may be substituted with other technically equivalent elements and the materials used, as well as the shapes and dimensions of the various components, may vary according to requirements.

The invention claimed is:

1. A filter for capsules for making espresso coffee by passing pressurised hot water through ground coffee powder, the filter (2) being rigid or semi-rigid, bowl-shaped and comprising a filter base wall (3), a filter lateral wall (4), a filter upper edge (5) and a plurality of passages passing through the filter, each passage passing through the filter comprising an inlet section (10) facing towards an inner part (6) of the bowl and an outlet section (11) facing towards an outer part (7) of the bowl, the filter (2) also having a central axis, characterised in that all passages passing through the filter are made in a peripheral zone of the filter (2), and in that at least the inlet sections (10) of all passages passing through the filter are made in parts of the filter (2) which are radially separated from the central axis by a distance equal to at least two thirds of the minimum radial distance of the filter lateral wall (4) from the central axis.

2. The filter according to claim 1, characterised in that at least the inlet sections (10) of the passages are made exclusively in the filter lateral wall (4).

3. The filter according to claim 2, characterised in that said inlet sections (10) of the passages made in the filter lateral wall (4) are positioned near to the filter base wall (3).

4. The filter according to claim 2, characterised in that the passages are through holes (9) and in that at the outer part (7) of the bowl at least several through holes (9) made in the filter lateral wall (4) also each constitute an outflow channel (13) for the espresso coffee, extending on the filter lateral wall (4) as far as the filter base wall (3), and in that the corresponding outlet sections (11) extend partly on the filter lateral wall (4) and partly on the filter base wall (3).

5. The filter according to claim 4, characterised in that the filter also comprises a plurality of spacer elements (8) which project relative to the filter base wall (3) and in that at least several of said spacer elements (8) are distributed along the periphery of the filter base wall (3) and in that at least several of said outflow channels (13) also partly extend on said spacer elements (8) distributed along the periphery of the filter base wall (3).

6. The filter according to claim 4, characterised in that at least the inlet sections (10) are elongate according to a main trajectory of extension and each have a length, measured along the main trajectory of extension, which is greater than their width, measured transversally to the main trajectory of extension.

7. The filter according to claim 2, characterised in that the filter base wall (3) has a main plane of extension and in that the filter lateral wall (4) has a height, relative to the filter base wall (3), measured perpendicularly to the main plane of extension, which is less than one third of the maximum width of the filter base wall (3) measured parallel to the main plane of extension.

8. The filter according to claim 1, characterised in that at least the inlet sections (10) of the passages are made exclusively in the filter base wall (3).

9. The filter according to claim 8, characterised in that the filter base wall (3) has a main plane of extension and in that the filter lateral wall (4) has a height, relative to the filter base wall (3), measured perpendicularly to the main plane of extension, which is less than one third of the maximum width of the filter base wall (3) measured parallel to the main plane of extension.

10. The filter according to claim 1, characterised in that at least the inlet sections (10) of the passages are made partly in the filter lateral wall (4) and partly in the filter base wall (3).

11. The filter according to claim 10, characterised in that said inlet sections (10) of the passages made in the filter lateral wall (4) are positioned near to the filter base wall (3).

12. The filter according to claim 10, characterised in that the passages are through holes (9) and in that at the outer part (7) of the bowl at least several through holes (9) made in the filter lateral wall (4) also each constitute an outflow channel (13) for the espresso coffee, extending on the filter lateral wall (4) as far as the filter base wall (3), and in that the corresponding outlet sections (11) extend partly on the filter lateral wall (4) and partly on the filter base wall (3).

13. The filter according to claim 12, characterised in that at least the inlet sections (10) are elongate according to a main trajectory of extension and each have a length, measured along the main trajectory of extension, which is greater than their width, measured transversally to the main trajectory of extension.

14. The filter according to claim 10, characterised in that the filter base wall (3) has a main plane of extension and in that the filter lateral wall (4) has a height, relative to the filter base wall (3), measured perpendicularly to the main plane of extension, which is less than one third of the maximum width of the filter base wall (3) measured parallel to the main plane of extension.

15. The filter according to claim 1, characterised in that the passages are through holes (9).

16. The filter according to claim 15, characterised in that at least the inlet sections (10) are elongate according to a main trajectory of extension and each have a length, measured along the main trajectory of extension, which is greater than their width, measured transversally to the main trajectory of extension.

17. The filter according to claim 16, characterised in that the width of said inlet sections (10) is less than 0.4 mm.

18. The filter according to claim 16, characterised in that the length of said inlet sections (10) is less than 5 mm.

19. The filter according to claim 16, characterized in that the width of said inlet sections (10) is less than 0.25 mm.

20. The filter according to claim 16, characterized in that the length of said inlet sections (10) is less than 2 mm.

21. The filter according to claim 15, characterised in that the sum of the areas of the inlet sections (10) of all of the through holes (9) is between 10 and 20 mm$^2$.

22. The filter according to claim 15, characterised in that the filter comprises between 40 and 70 through holes (9).

23. The filter according to claim 15, characterised in that said through holes (9) have a transit cross-section which increases from the inlet section (10) to the outlet section (11).

24. The filter according to claim 1, characterised in that the filter also comprises a plurality of spacer elements (8) which project relative to the filter base wall (3).

25. The filter according to claim 1, characterised in that the filter also comprises at least one shaped portion (14) extending from the filter base wall (3) towards the inner part (6) of the bowl and which, at the outer part (7) of the bowl, forms a housing (21) for at least a piercing spike which, in use, pierces the capsule (1) to allow the espresso coffee to flow out of the capsule (1).

26. The filter according to claim 1, characterised in that the filter base wall (3) has a main plane of extension and in that the filter lateral wall (4) has a height, relative to the filter base wall (3), measured perpendicularly to the main plane of extension, which is less than one third of the maximum width of the filter base wall (3) measured parallel to the main plane of extension.

27. The filter according to claim 1, wherein the filter base wall (3) has a main plane of extension and the filter lateral wall (4) extends transversally to the main plane of extension, starting from an outer edge of the filter base wall (3) and from a side of the filter base wall (3) intended in use to be facing towards the coffee powder, the filter lateral wall (4) being radially separated from the central axis by a radial distance that has a minimum value.

28. A capsule for making espresso coffee by passing pressurised hot water through ground coffee powder, comprising:

a cup-shaped main body (15) comprising a main body base wall (16), a main body lateral wall (17) and a main body upper edge (18);
a lid fixed to the main body upper edge (18) for closing the cup-shaped main body (15);
at least one dose of coffee powder positioned inside the main body (15); at least a filter (2) according to claim 1, positioned inside the main body (15) near to the main body base wall (16), and positioned between the coffee powder and the main body base wall (16), the filter upper edge (5) being coupled to the main body lateral wall (17); and
an outflow chamber (20) for the espresso coffee made between the filter base wall (3) and the main body base wall (16) and between the filter lateral wall (4) and the main body lateral wall (17), the outlet sections (11) of the passages facing the outflow chamber (20).

29. The capsule according to claim 28, characterised in that the filter also comprises at least one shaped portion (14) extending from the filter base wall (3) towards the inner part (6) of the bowl and which, at the outer part (7) of the bowl, forms a housing (21) for at least a piercing spike which, in use, pierces the capsule (1) to allow the espresso coffee to flow out of the capsule (1) and in that the filter base wall (3) has a main plane of extension and in that said shaped portion (14) protrudes from the filter base wall (3), perpendicularly to the main plane of extension, by a distance which is less than one third of the distance between the main body base wall (16) and the lid.

30. The capsule according to claim 29, characterised in that a plane passing through the filter upper edge (5) is separated from the filter base wall (3) by less than one third of the distance between the filter base wall (3) and the lid.

31. The capsule according to claim 28, characterised in that a plane passing through the filter upper edge (5) is separated from the filter base wall (3) by less than one third of the distance between the filter base wall (3) and the lid.

32. A capsule for making espresso coffee by passing pressurised hot water through ground coffee powder, comprising:

a cup-shaped main body (15) comprising a main body base wall (16), a main body lateral wall (17) and a main body upper edge (18);
a lid fixed to the main body upper edge (18) for closing the cup-shaped main body (15);
at least one dose of coffee powder positioned inside the main body (15);
at least a filter (2) according to claim 2, positioned inside the main body (15) near to the main body base wall (16), and positioned between the coffee powder and the main body base wall (16), the filter upper edge (5) being coupled to the main body lateral wall (17); and
an outflow chamber (20) for the espresso coffee made between the filter base wall (3) and the main body base wall (16) and between the filter lateral wall (4) and the main body lateral wall (17), the outlet sections (11) of the passages facing the outflow chamber (20).

33. The capsule according to claim 32, characterised in that the filter also comprises at least one shaped portion (14) extending from the filter base wall (3) towards the inner part (6) of the bowl and which, at the outer part (7) of the bowl, forms a housing (21) for at least a piercing spike which, in use, pierces the capsule (1) to allow the espresso coffee to flow out of the capsule (1) and in that the filter base wall (3) has a main plane of extension and in that said shaped portion (14) protrudes from the filter base wall (3), perpendicularly to the main plane of extension, by a distance which is less than one third of the distance between the main body base wall (16) and the lid.

34. A capsule for making espresso coffee by passing pressurised hot water through ground coffee powder, comprising:
- a cup-shaped main body (15) comprising a main body base wall (16), a main body lateral wall (17) and a main body upper edge (18);
- a lid fixed to the main body upper edge (18) for closing the cup-shaped main body (15);
- at least one dose of coffee powder positioned inside the main body (15);
- at least a filter (2) according to claim 8, positioned inside the main body (15) near to the main body base wall (16), and positioned between the coffee powder and the main body base wall (16), the filter upper edge (5) being coupled to the main body lateral wall (17); and
- an outflow chamber (20) for the espresso coffee made between the filter base wall (3) and the main body base wall (16) and between the filter lateral wall (4) and the main body lateral wall (17), the outlet sections (11) of the passages facing the outflow chamber (20).

35. The capsule according to claim 34, characterised in that the filter also comprises at least one shaped portion (14) extending from the filter base wall (3) towards the inner part (6) of the bowl and which, at the outer part (7) of the bowl, forms a housing (21) for at least a piercing spike which, in use, pierces the capsule (1) to allow the espresso coffee to flow out of the capsule (1) and in that the filter base wall (3) has a main plane of extension and in that said shaped portion (14) protrudes from the filter base wall (3), perpendicularly to the main plane of extension, by a distance which is less than one third of the distance between the main body base wall (16) and the lid.

36. A capsule for making espresso coffee by passing pressurised hot water through ground coffee powder, comprising:
- a cup-shaped main body (15) comprising a main body base wall (16), a main body lateral wall (17) and a main body upper edge (18);
- a lid fixed to the main body upper edge (18) for closing the cup-shaped main body (15);
- at least one dose of coffee powder positioned inside the main body (15);
- at least a filter (2) according to claim 10, positioned inside the main body (15) near to the main body base wall (16), and positioned between the coffee powder and the main body base wall (16), the filter upper edge (5) being coupled to the main body lateral wall (17); and
- an outflow chamber (20) for the espresso coffee made between the filter base wall (3) and the main body base wall (16) and between the filter lateral wall (4) and the main body lateral wall (17), the outlet sections (11) of the passages facing the outflow chamber (20).

37. The capsule according to claim 36, characterised in that the filter also comprises at least one shaped portion (14) extending from the filter base wall (3) towards the inner part (6) of the bowl and which, at the outer part (7) of the bowl, forms a housing (21) for at least a piercing spike which, in use, pierces the capsule (1) to allow the espresso coffee to flow out of the capsule (1) and in that the filter base wall (3) has a main plane of extension and in that said shaped portion (14) protrudes from the filter base wall (3), perpendicularly to the main plane of extension, by a distance which is less than one third of the distance between the main body base wall (16) and the lid.

\* \* \* \* \*